United States Patent
Wang

(10) Patent No.: US 7,884,137 B2
(45) Date of Patent: Feb. 8, 2011

(54) HYDROXY POLYESTERS AND USES AS BIODEGRADABLE DEMULSIFIERS

(75) Inventor: Wei Wang, Aberdeen (GB)

(73) Assignee: M-I L.L.C., Houston, TX (US)

( * ) Notice: Subject to any disclaimer, the term of this patent is extended or adjusted under 35 U.S.C. 154(b) by 0 days.

(21) Appl. No.: 12/035,745

(22) Filed: Feb. 22, 2008

(65) Prior Publication Data

US 2008/0207780 A1  Aug. 28, 2008

Related U.S. Application Data

(60) Provisional application No. 60/891,054, filed on Feb. 22, 2007.

(51) Int. Cl.
  *B01D 17/05* (2006.01)
(52) U.S. Cl. ..................................... 516/139
(58) Field of Classification Search ................. 516/139
  See application file for complete search history.

(56) References Cited

U.S. PATENT DOCUMENTS

| | | | |
|---|---|---|---|
| 3,471,421 A | 10/1969 | Vegter et al. | |
| 3,859,318 A | 1/1975 | Lesuer | |
| 3,867,354 A | 2/1975 | Betts et al. | |
| 4,032,514 A | 6/1977 | Buriks et al. | |
| 5,114,616 A * | 5/1992 | Kupfer et al. | 516/158 |
| 5,340,487 A | 8/1994 | Emert et al. | |
| 5,540,743 A | 7/1996 | Cherpeck | |
| 5,609,794 A | 3/1997 | Taylor | |
| 5,661,220 A | 8/1997 | Faul et al. | |
| 5,663,247 A * | 9/1997 | Sorensen et al. | 525/533 |
| 5,977,404 A | 11/1999 | Kwetkat et al. | |
| 6,150,458 A | 11/2000 | Weikard et al. | |
| 6,316,396 B1 | 11/2001 | Kwetkat et al. | |
| 6,593,376 B1 | 7/2003 | Klaas et al. | |
| 2002/0082174 A1 | 6/2002 | Aldrich et al. | |
| 2004/0167308 A1 | 8/2004 | Becker | |
| 2006/0036057 A1 | 2/2006 | Lang | |
| 2007/0100002 A1* | 5/2007 | Leinweber et al. | 516/179 |
| 2007/0244248 A1 | 10/2007 | Behles | |

OTHER PUBLICATIONS

International Search Report and Written Opinion, mailed Jun. 30, 2008, for PCT/US2008/053379 filed Feb. 8, 2008.

* cited by examiner

*Primary Examiner*—Ling-Siu Choi
*Assistant Examiner*—Chun-Cheng Wang

(57) ABSTRACT

Hydroxyl polyester compounds or compositions which are useful as oilfield demulsifiers are prepared through esterifying carboxylic compounds and epoxide compounds under controlled molar ratios. The hydroxyl polyesters are useful as biodegradable demulsifiers on oil productions.

11 Claims, No Drawings

HYDROXY POLYESTERS AND USES AS BIODEGRADABLE DEMULSIFIERS

CROSS-REFERENCE TO RELATED APPLICATIONS

This application, pursuant to 35 U.S.C, §119(e), claims priority to U.S. Patent Application No. 60/891,054, filed Feb. 22, 2007, which is herein incorporated by reference in its entirety.

BACKGROUND OF INVENTION

Crude emulsions are formed when oil and water are intimately mixed together. This occurs in the near well bore, production tubing, wellhead, across valves and in pumps. These emulsions cause many problems for the oil and gas producer and have to be broken or demulsified, allowing the salt water component of the emulsion to be separated and removed. This enables the produced oil to meet BS&W (basic sediment and water) and salt specifications.

The dehydration of petroleum emulsions is generally accomplished by techniques such as settling, heat treatments, centrifuging, and application of electrical fields and addition of chemicals, i.e. demulsifies. The use of demulsifies has proven most effective in resolving crude emulsions.

Prior art demulsifies are mostly polymeric surfactants such as copolymers of ethylene oxide and propylene oxide, typically EO-PO-EO block copolymers, or alkyl phenol-formaldehyde resins or blends of various surface-active substances. These compounds are none-biodegradable and some are very toxic such as those with phenol group. Due to more and more severe environmental and ecotoxicological constraints, currently the challenge and requirement to use biodegradable and low toxic demulsifiers is strongly increasing in the oil production industry.

SUMMARY OF INVENTION

In one aspect, the claimed invention is directed to block, star or branched amphiphilic hydroxyl polyester composition that are useful as demulsifiers, particularly as biodegradable demulsifiers. In one illustrative embodiment, the compositions are formed in an esterification reaction wherein the hydroxyl ester bond is formed by the reaction of one carboxylic compound with at least two carboxylic groups on molecule with at least one epoxide compound with monoepoxide group. Alternatively, the compositions are formed in an esterification reaction wherein the hydroxyl ester bond is formed by the reaction of one epoxide compound with multi-epoxide groups on molecule with at least one carboxylic compound with as least one carboxylic group. The esterification reactions between epoxide compounds and carboxylic acid compounds may be carried out in melt, solution or solution mixtures at a temperature from room temperature to 200° C. at ambient pressure with or without addition of catalyst. Preferably, the esterification reaction temperature is between 60 and 150° C. without addition of catalyst. The carboxylic acid compound is preferably in a molar excess to another reactive component, i.e. epoxide compound and more preferably the molar ratio of carboxylic group to epoxide group is from 1.90:1 to 1.01:1. In one illustrative embodiment, an extra amount of small molecular carboxylic acid, such as propionic acid, is used to increase the conversion of epoxide group in order to improve the toxicity of the final demuslfier products. The resulting polymeric compounds preferably have a molecular weight greater than from about 500 kg/mole. The resulting compositions are useful as demulsifiers effective in demulsifying water-in-oil emulsions, particularly crude oil emulsions.

Other aspects and advantages of the invention will be apparent from the following description and the appended claims.

DESCRIPTION

Traditional demulsifies are poorly biodegradable because of long carbon-carbon chain or carbon-oxygen ether linkages such as EO-PO-EO block copolymers. Establishment of weak and easily cleavable bonds such as ester bond is the key point in this invention. Another important point in this work is to control the molecular weight of the said chemical compounds in order to have them biodegraded quickly.

It was discovered in the invention that amphiphilic hydroxyl ester compounds, which prepared through the esterifications between carboxylic compounds and epoxide compounds, under controlled raw material, reactant molar ratio and molecular weight, can demulsify crude emulsions. Their biodegradability can be controlled over 20% and mostly higher than 60% in sea water in 28 days (OECD306). The toxicity can be controlled by highly increasing conversion of epoxide group through excess of carboxylic compounds. EC50 may reach higher than 10 mg/L. Such hydroxyl polyester compounds or composites may be a simple block type or a star type or a branch polymer, depending on what starting materials are used.

The first illustrative embodiment is to react polyacids having at least two carboxylic acid groups in one molecule, or a polyanhydride, with one monoepoxide compound or more, under ambient atmosphere and at a general temperature between room temperature and 200° C. with or without added catalyst. The resulted hydroxyl polyester compounds, highly biodegradable and low toxicity can be achieved by controlled raw materials and material feed ratio.

In the second illustrative embodiment, the hydroxyl ester bonds are performed by reacting an epoxide compound with a carboxylic compound, preferred a multi-epoxide compound, such as a di- or tri-epoxide compound, with one mono-carboxylic acid compound or more, or anhydride compounds, under ambient atmosphere and at a general temperature between 60 and 200° C. with or without added catalyst. The resulted hydroxyl polyester compounds, highly biodegradability can be achieved by controlled raw materials and material feed ratio. Some of these products can demulsify well on both heavy and light crude emulsions, and some work well specially on heavy crude emulsions, depending on their molecular structures.

Esterification can be normally carried out by reacting carboxylic acid groups or carboxylic anhydride groups with hydroxylic groups at a higher temperature. Esterification can also be performed by the reaction between epoxide and carboxylic or carboxylic anhydride group at acidic condition or environment, which results in the products of hydroxyl esters compounds. This has been used to prepare epoxy resin esters for decades. U.S. Pat. No. 3,252,926 claimed a flexographic printing ink by esterification of diepoxide and ricinoleic acid. U.S. Pat. Nos. 3,471,421 and 3,867,354 disclosed the processes for the preparations of epoxy resin esters in the presence of organic stannic compounds and chromium salicylate as catalysts, respectively. U.S. Pat. No. 6,150,458 described a process for preparing (meth) acrylic acid esters, which involved the reaction of (meth) acrylic acid with a compound containing two or more epoxide groups in the presence of solvent. Blainvaux, F et al studied on epoxy-carboxy reaction on model compounds, 3-phenoxy-1,2-epoxy propane and dodecanoic acid in the bulk using catalyst of either a tertiary amine (N,N-dimethyldodecylamine) or a chromium chelate (chromium diisopropylsalicylate)(Polymer Bulletin, 1985, 13, 237). Kolot, V et al reported vernonia oil based acrylate and methacrylate polymers by reacting vernonia oil, a naturally epoxidized oil, with acrylic or methacrylic acid, the highest conversion (85-98%) of epoxy groups was obtained when the reaction was proceeded with an excess of carboxylic acid at 100-120° C. (J. Appl. Polym. Sci., 2004, 91, 3835).

In one embodiment of the invention, biodegradable demulsifiers are synthesized by esterifying polyacids with at least one monoepoxide compound, under the molar ratio of between 1.90:1 to 1.01:1 (carboxylic groups to epoxide groups), at a moderate temperature without addition of catalyst and without any application of pressure, vacuum or nitrogen. One filtration step is used for product purification if needed.

Polyacids are water soluble or highly hydrophilic organic compounds or polymers with at least two carboxylic group on molecules, such as citric acid, nitrilotriacetic acid, ethylenediaminetetraacetic acid (EDTA), diethylenetriamine pentaacetic acid (DTPA), poly(ethylene glycol) diacid, carboxylmethyl cellulose, alginate, poly(malic acid), polyacrylic acid and those derivatives thereof.

The monoepoxide compounds, are the hydrophobic organic compounds having one epoxide group on molecules, e.g. epoxydodecane, epoxytetradecane, epoxyhexadecane, glycidyl hexadecyl ether and thereof.

The hydroxyl polyester compounds or compositions prepared in this embodiment are in the forms of high viscous liquids, soft solids or powders in white or light yellow colour.

In another embodiment of the invention, hydroxyl polyester compounds or compositions are prepared through esterification by reacting multi-epoxide compounds with excess carboxylic acid group; the carboxylic group to epoxide group molar ratio is between 1.90:1 to 1.01:1, at a moderate temperature without addition of catalyst and without any application of pressure, vacuum or nitrogen. One filtration step is used for product purification if needed.

The epoxides are selected from the group of hydrocarbon compounds containing at least two epoxide groups, e.g. trimethylolpropane triglycidyl ether, poly(propylene) diglycidyl ether, glycerol diglycidyl ether, glycerol triglycidyl ether, bisphenol A diglycidyl ether, butanediyi diglycedyl ether, vernonia oil and castor oil glycidyl. ether and the derivatives thereof, especially ethoxylated or propoxylated derivatives.

The carboxylic acids are one group of organic compounds with at least one carboxylic group. Preferably, but not necessarily, it has enough ethylene oxide (EO) segment and to be water soluble or highly hydrophilic, such as glycolic acid ethoxylate lauryl ether, glycolic acid ethoxylate oleyl ether, ethoxylated poly(ethylene glycol) acid, ethoxylated carboxylic acid and ethoxylated carboxylic acid anhydrides, ethoxylated glucuronic acid and those derivatives thereof.

The hydroxyl polyesters prepared in this way are in the forms of highly viscous liquids, soft solids in white, light yellow or brown colour or in the form of solutions.

The chemical compounds prepared in this invention are amphiphilic surfactants having strong surface activity, their HLB value or RSN (relative water solubility number) can be controlled by controlling the reactant materials and feeding molar ratios. The molecular weight is from 500 mol/kg to thousands or higher. By controlling the raw materials and reactant molar ratio, such hydroxyl polyesters can naturally biodegrade over 20% and mostly can reach over 60% in 28 days in sea water according to OECD 306 test method.

Toxicity is another important issue for green demulsifiers. It is required that EC50 is higher than 10 mg/L if biodegradability is lower than 60% but over 20%.

The epoxide compounds have been concerned toxic in literature because of the active epoxide group. However, the epoxide ring opens after reacted with carboxyl group and no longer toxic. And the unreacted epoxides can be removed by washing, or the unreacted epoxide group can be eliminated by further extensively reacting with added small molecular acid such as acetic acid or propionic acid.

Demulsification performance of the hydroxyl polyester compounds or compositions prepared in this work is significant for breaking various crude oil emulsions. Water drop is rapid and accompanying with zero or very low BS (basic sediment) and with low water content in oil phase.

The following examples are provided to further illustrate the application and the use of the methods and compositions of the present invention. Unless otherwise noted, standard laboratory practices were utilized during the formulation and testing described below using commercial grade or better chemicals.

EXAMPLE 1

20 g citric acid (MW: 192.12) was added into 100 ml flat bottom flask, then 38.4 g 1,2-epoxydodecane (MW: 184.32) was added, kept stirring and increased temperature to 150° C. in oil bath and then kept the temperature for 7 hours under stirring.

EXAMPLE 2

40 g polyethylene glycol diacid (MW: 600) was added into 100 ml flat bottom flask, heated to 120° C. in oil bath and stirred at 120° C. for 2 hours. 34 g glycidyl hexadecyl ether (MW: 298.50) was then added and keeping reaction for 8 hours under stirring at 120° C.

EXAMPLE 3

30 g polyethylene glycol diacid (MW: 600) was added into 100 ml flat bottom flask, heated to 120° C. in oil bath and stirred at 120° C. for 2 hours. 11.4 g 1,2-epoxydodecane (MW: 184.32) was added and then stirred at 120° C. for 11 hours.

EXAMPLE 4

30 g poly ethylene glycol diacid (MW: 600) was added into 100 ml flat bottom flask, heated to 120° C. in oil bath and stirred at 120° C. for 2 hours. 11.4 g 1,2-epoxydodecane (MW: 184.32) was added and then stirred at 120° C. for 11 hours, then added 2 ml propionic acid at 120° C. for 4 hours, and then increased temperature to 150° C. and stirred for another 2 hours.

EXAMPLE 5

10 g diethylenetriaminepentaacetic acid (DTPA) (MW: 393.35) was added to 100 ml flask and then 33 g glycidyl hexadecyl ether (MW: 298.50) was added. Temperature of oil bath was increased to 200° C. and then stirred at 200° C. for 16 hours.

EXAMPLE 6

5 g carboxylmethyl cellulose (CMC, MW: 50 k) was dissolved with 100 ml distilled water in 250 ml round bottom flask, then 15 g 1,2-epoxyhexadecane was dissolved in 50 ml acetone and the solution was added in CMC solution drop wise within 1 hour. The pH of the mixture in flask was adjusted to 2.3 by adding 3 ml 5M HCl. The flask was then refluxed for 24 hours, cooled down and the pH value was 3.0 and adjusted to about 7 with 2.5 M NaOH. Then 100 ml acetone was added to precipitate the product and then washed the precipitate with 50 IPA three times and finally dried at 60° C.

EXAMPLE 7

This example is to improve biodegradability of example 7 by using low molecular weight carboxylmethyl cellulose.

To prepare low molecular weight CMC: LCMC: 20 g carboxylmethyl cellulose (CMC, MW: 50 k) was mixed with 20 g IPA and stirred for 1 hour in a flask. 12 ml $H_2O_2$ was added and stirred for 30 minutes then put the flask in 110° C. oven for 1 hour, and then washed with 100 ml IPA and dried at 60° C.

To prepare CMC hydroxyl polyester with LCMC: 2.5 g LCMC was dissolved in 8 ml water (Concentration: 31.3%), pH was adjusted to 2.3 by adding 1 ml 20% sulphuric acid, then 5 g 1,2-epoxyhexadecane was added with the solution in 16 ml acetone drop wise. Refluxed at 60° C. for 20 hours, cooled down and adjust pH to about 7 with 2.5 M NaOH. Added 50 ml IPA to precipitate and then washed with IPA three times and finally dried at 60° C.

EXAMPLE 8

40 g glycolic acid ethoxylate lauryl ether (MW: 690) was added to 250 ml flask and heated to 120° C. in oil bath and stirred for 2 hours, then 10 g poly(propylene glycol) diglycidyl ether (MW: 640) was added and continued stirring for 6 hours at 120° C. Added 1.2 ml propionic acid and continued stirring for 4 hours and then stirred for 2 hours at 150° C.

EXAMPLE 9

100 g glycolic acid ethoxylate lauryl ether (MW: 690) was added to 250 ml flask and heated to 120° C. in oil bath, then 10 g trimethylolpropane triglycidyl ether (MW: 302) was added and kept stirring for 6 hours at 120° C. Added 7.4 ml propionic acid and continued stirring for 4 hours and then stirred for 2 hours at 150° C.

EXAMPLE 10

2.5 g citric acid and 30 g poly(propylene glycol) diglycidyl ether (MW: 640) were added to 250 ml flask and ten heated to 120° C. in oil bath and stirred for 7 hours at 120° C., then added 32 glycolic acid ethoxylate lauryl ether (MW: 690) and reacted for another 8 hours at 120° C.

Biodegradability and toxicity: The results of biodegradability and toxicity are summarized in the Table 1. Only sample 6 is degraded lower than 20% because of higher molecular weight of raw CMC used (50 k in molecular weight). If CMC was degraded with $H_2O_2$ and used as raw material, then the modified CMC hydroxyl polyester can degrade to about 60% (Example 7). Sample 10 has degradability of 34% and EC50 is 10 mg/L, just meet regulatory standard. Samples of 3, 7 and 8 show lower than 10 in EC50value although close to, but their biodegradability is over 60%.

TABLE 1

Results of Biodegradability and Toxicity

| Sample name | Appearance at ambient | Biodegradability (%) (OECD 306) | Toxicity (mg/L) (EC50 to Skeletonema algal) |
|---|---|---|---|
| 1 | light yellow viscous liquid | 99 | >1000 |
| 2 | White, high viscous liquid | 81 | 10-100 |
| 3 | light yellow high viscous liquid | 71 | 1-10 |
| 4 | light yellow high viscous liquid | 67 | 45 |
| 5 | brown colour soft solid | 79 | 80 |
| 6 | white powder | 14 | — |
| 7 | light yellow powder | 57 | >1000 |
| 8 | light yellow soft solid | 76 | 5-10 |
| 9 | light yellow soft solid | 68 | 5-10 |
| 10 | light yellow soft solid | 34 | 10 |

Demulsification tests: Two crude oil from North Sea oil field were used to evaluate demulsification performance of these samples.

The first crude emulsion was prepared by mixing crude I with 20% salt water (1% NaCl) through sonic probe mixer, API is 34. Samples of the crude emulsion were placed in graduated prescription bottles and heated to 60° C. in a water bath. The samples from 1 to 10 were added to the crude samples respectively with 100 ppm by weight using 2% solutions in green solvent BDGE (butyldiglycol ether) except for samples 6 and 7 which are soluble in 50:50 water and BDGE mixture. The treated crude samples were shaken 100 times by hands and then were returned to the water bath at 60° C. Water drop in the test bottles were recorded every 2, 4, 6, 8, 10 and 20 minutes. Finally the residual BS (basic sediment) and water contents in oil phase (thieved from approximately 15 mls above interface) was determined by centrifugation.

TABLE 2

Demulsification Results with Light Crude Oil

| | Water drop (ml) in minutes | | | | | | Oil phase analysis | |
|---|---|---|---|---|---|---|---|---|
| Samples | 2 | 4 | 6 | 8 | 10 | 20 | Water (%) | Emulsion (%) |
| Blank | 0 | 0 | 0 | 0 | 0 | 0 | 0 | 1.0 |
| 1 | 0 | 2 | 8 | 12 | 16 | 26 | 0.4 | 0.2 |
| 2 | 18 | 26 | 28 | 28 | 28 | 28 | 0.6 | 0 |
| 3 | 8 | 18 | 28 | 28 | 28 | 28 | 0.4 | 0 |
| 4 | 6 | 20 | 28 | 28 | 28 | 28 | 0.4 | 0 |
| 5 | 0 | 2 | 8 | 16 | 20 | 26 | 0 | 0.4 |
| 6 | 0 | 2 | 8 | 18 | 22 | 28 | 0 | 0.4 |
| 7 | 0 | 2 | 10 | 18 | 24 | 28 | 0.2 | 0.2 |
| 8 | 6 | 10 | 16 | 22 | 26 | 28 | 0.4 | 0 |
| 9 | 10 | 22 | 28 | 28 | 28 | 28 | 0.4 | 0 |
| 10 | 2 | 6 | 10 | 12 | 16 | 28 | 0.4 | 0 |

The second crode emulsion was prepared by mixing crude oil II with 20% salt water (1% NaCl) through sonic probe mixer, API is 16. The performance was tested as described above, except that the water drop in the test bottles were recorded every 10, 20, 30, 60, 120 and 180 minutes.

TABLE 3

Demulsification Results with Heavy Crude Oil

| Samples | Water drop (ml) in minutes | | | | | | Oil phase analysis | |
|---|---|---|---|---|---|---|---|---|
| | 10 | 20 | 30 | 60 | 120 | 180 | Water (%) | Emulsion (%) |
| Blank | 0 | 0 | 0 | 1 | 2 | 4 | 0 | 13 |
| 1 | 2 | 5 | 8 | 10 | 12 | 16 | 5.2 | 0 |
| 2 | 0 | 2 | 2 | 4 | 6 | 8 | 8 | 1 |
| 3 | 1 | 3 | 5 | 9 | 14 | 16 | 5.0 | 0 |
| 4 | 1 | 3 | 4 | 9 | 14 | 16 | 5.2 | 0 |
| 5 | 0 | 2 | 4 | 8 | 10 | 16 | 4.4 | 0 |
| 6 | 2 | 4 | 8 | 12 | 14 | 16 | 4.8 | 0 |
| 7 | 2 | 4 | 8 | 12 | 14 | 16 | 4.4 | 0 |
| 8 | 0 | 2 | 4 | 6 | 9 | 12 | 7 | 0.4 |
| 9 | 1 | 2 | 4 | 6 | 11 | 14 | 6 | 0 |
| 10 | 0.5 | 2 | 4 | 6 | 12 | 14 | 6 | 0 |

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed:

1. A process for demulsifing a water-in-oil emulsion, wherein the water-in-oil emulsion is contacted with a biodegradable demulsifier comprising an amphiphilic hydroxyl polyester, wherein the ester bond of the demulsifier is formed by the reaction of one carboxylic compound with at least two carboxylic groups on molecule with at least one epoxide compound with monoepoxide group.

2. The process of claim 1, wherein the demulsifier comprises a block amphiphilic hydroxyl polyester.

3. The process of claim 1, wherein the demulsifier comprises a star or branched amphiphilic hydroxyl polyester.

4. The process of claim 1, wherein the carboxylic acid group of the demulsifier is a molar excess to another reactive organic group.

5. The process of claim 1, wherein the molar ratio of carboxylic group to epoxide group is from 1.90:1 to 1.01:1.

6. The process of claim 1, wherein the esterification reactions between epoxide compounds and carboxylic acid compounds are carried out in melt, solution or solution mixtures.

7. The process of claim 1, wherein the water-in-oil emulsion is a crude oil emulsion.

8. The process of claim 1, wherein the carboxylic acid group is a molar excess to the reactive monoepoxide group.

9. The process of claim 1, wherein the reaction is carried out at a temperature from room temperature to 200° C. at ambient pressure with or without addition of catalyst.

10. The process of claim 1, further comprising a filtration or centrifugation step to remove unreacted compounds or impurities.

11. A composition for demulsifying a water-in-oil emulsion, the composition comprising a biodegradable amphiphilic hydroxyl polyester, wherein the ester bond of the demulsifier is formed by the reaction of one carboxylic compound with at least two carboxylic groups on molecule with at least one epoxide compound with monoepoxide group.

* * * * *